United States Patent [19]

Maeda

[11] Patent Number: 5,243,580
[45] Date of Patent: Sep. 7, 1993

[54] HEAD FOR A MAGNETO-OPTICAL RECORDING APPARATUS

[75] Inventor: Fumisada Maeda, Tokyo, Japan

[73] Assignee: Sony Corporation, Tokyo, Japan

[21] Appl. No.: 889,669

[22] Filed: May 28, 1992

[30] Foreign Application Priority Data

Jun. 3, 1991 [JP] Japan ................... 3-131258

[51] Int. Cl.⁵ .................. G11B 11/14; G11B 13/04; G11B 5/127
[52] U.S. Cl. ...................... 369/13; 360/114; 360/59
[58] Field of Search ............ 369/13, 126; 360/114, 360/59, 66; 365/122

[56] References Cited

U.S. PATENT DOCUMENTS

| | | | |
|---|---|---|---|
| 4,843,600 | 6/1989 | Miyajima et al. | 369/13 |
| 5,088,074 | 2/1992 | Sato | 369/13 |
| 5,095,470 | 3/1992 | Oka et al. | 369/13 |

Primary Examiner—Robert J. Pascal
Assistant Examiner—Ali Neyzari
Attorney, Agent, or Firm—Philip M. Shaw, Jr.

[57] ABSTRACT

The present invention is directed to a magneto-optical recording apparatus in which a rotating device for the recording magnet is composed of a drive coil and a yoke. Therefore, the efficiency of the rotating device can be increased to thereby reduce the power consumption. Also, since the recording magnet is attracted to the yoke, the settle position of the recording magnet can be stabilized satisfactorily.

8 Claims, 3 Drawing Sheets

HEAD FOR A MAGNETO-OPTICAL RECORDING APPARATUS

BACKGROUND OF THE INVENTION

1. Field of the Invention

The present invention generally relates to magneto-optical recording apparatus and, more particularly, to a magneto-optical recording apparatus in which the recording can be effected on two kinds of magneto-optical media.

2. Description of the Prior Art

Conventional magneto-optical recording media present the erase mode in which magnetic fields of a magnetic layer formed on a medium are oriented in the constant direction. Of these magnetic fields, a part thereof is directed in the opposite direction and thereby an information is recorded on the medium. To this end, in a magneto-optical recording apparatus using such magneto-optical recording medium, a recording magnet, which is provided together with a magneto-optical head, for example, is made rotatable.

FIG. 1 of the accompanying drawings is a schematic diagram showing an arrangement of such conventional magneto-optical recording apparatus.

Referring to FIG. 1, a magneto-optical head 22 is disposed under a magneto-optical medium (i.e., magneto-optical disc) 21, and a recording magnet 23 is disposed above the magneto-optical disc 21. This recording magnet 23 is pivotally provided about its center A and one and the other side of the recording magnet 23 relative to the center A are magnetized as a south (S) pole and a north (N) pole, respectively. A drive coil 24 is disposed above the recording magnet 23. When a current of positive or negative polarity is flowed in the drive coil 24, then the recording magnet 23 is rotated in response to a magnetic field formed on the drive coil 24.

When the recording is carried out, initially the recording magnet 23 is oriented in a predetermined direction and the continuous writing is carried out by the magneto-optical head 22, thereby setting the recording tracks on the magneto-optical disc 1 in the erase mode. Then, the recording magnet 23 is rotated and the magneto-optical head 22 is intermittently driven in response to an information, thereby the information being recorded. However, this conventional magneto-optical recording apparatus must erase the information before an information is recorded, which unavoidably hinders the smooth recording.

On the other hand, other magneto-optical medium (magneto-optical disc) including two magnetic layers having different coercive forces and Curie points is proposed to effect an overwrite recording by effectively utilizing different magnetic characteristics of these two magnetic layers.

FIG. 2 of the accompanying drawings shows an arrangement of such previously-proposed magneto-optical medium.

As shown in FIG. 2, a magneto-optical head 32 is disposed under a magneto-optical medium (i.e., magneto-optical disc) 31 and a recording magnet 33 is disposed above the magneto-optical disc 31. The recording magnet 33 is fixed so as to generate predetermined magnetic fields. Further, initializing magnets 34 and 35 for generating initializing magnetic fields are disposed in parallel to the recording magnet 33. According to the abovementioned arrangement, the overwrite recording can be effected on the magneto-optical disc 31.

Comparing the arrangement of the latter apparatus which carries out the overwrite recording and the arrangement of the former apparatus which carries out the recording after the information is erased, it is to be noted that the apparatus which carries out the overwrite recording is provided with the initializing magnets 34 and 35 while the apparatus which carries out the recording after information is erased is not provided with such initializing magnets. Further, while the recording magnet 23 is provided so as to become freely rotatable and the drive coil 24 is disposed above the recording magnet 23 in the apparatus which carries out the recording after information is erased, the recording magnet 33 in the apparatus which carries out the overwrite recording is fixed. Therefore, the following magneto-optical recording apparatus is proposed.

That is, the initializing magnets 34 and 35 are disposed in parallel to the recording magnet 23 in the above-mentioned apparatus for carrying out the recording after information is erased, thereby allowing recording to be carried out commonly for the discs 21 or 31.

In the above-mentioned apparatus, the discs 21 or 31 are housed in a disc cartridge 41 shown in FIG. 3, for example. In addition to a positioning aperture 42, a write protect aperture 43, an identifying aperture 44, for identifying the kinds of magneto-optical discs, is bored through the disc cartridge 41. The discs 21 or 31 housed in the disc cartridge 41 are exposed only through an opening portion 45 so that all elements such as the above-mentioned recording magnet 23, the initializing magnets 34, 35 or the like must be provided within a range of this opening portion 45.

However, in the above-mentioned apparatus, the width of the opening portion 45 of the disc cartridge 41 is about 40 mm. Thus, when the recording magnet 23 is provided at the center of the opening portion 45, the initializing magnets 34 and 35 must be provided within 20 mm of the recording magnet 23 and the initializing magnets 34 and 35 must be disposed within 15 mm between the centers. As a consequence, when the recording magnet 23 and the initializing magnets 34 and 35 are disposed close to each other, the recording magnet 23 is unavoidably influenced by magnetic forces of the initializing magnets 34 and 35. There is then the risk that a large drive current for driving the drive coil 24 is needed when the recording magnet 23, for example, is rotated or that the direction of the recording magnet 23 in the settle mode is displaced.

OBJECTS AND SUMMARY OF THE INVENTION

Accordingly, it is an object of the present invention to provide an improved magneto-optical recording apparatus in which the aforesaid shortcomings and disadvantages encountered with the prior art can be eliminated.

More specifically, it is an object of the present invention to provide a magneto-optical recording apparatus in which a power consumption can be reduced.

Another object of the present invention is to provide a magneto-optical recording apparatus in which a settle position of a recording magnet can be stabilized satisfactorily.

A further object of the present invention is to provide a magneto-optical recording apparatus in which a recording can be effected on two types of magneto-optical recording media.

Yet a further object of the present invention is to provide a magneto-optical recording apparatus which can be improved in reliability.

A magneto-optical recording apparatus according to the invention for recording information on different types of magneto-optic discs housed in a single type of cartridge having an opening portion, the cartridge including indicating means for indicating the type of disc housed in a disc cartridge, includes a rotatable recording magnet, the recording magnet being disposed within the opening portion of the disc cartridge at a position in which it is opposed to a magneto-optical head across a disc housed within the disc cartridge, rotating means for rotating the recording magnet depending upon the type of disc housed in the cartridge, i.e. depending upon whether the disc is a record-after-erasure type or an overwrite recording type as indicated by the indicating means, and at least on initializing magnet which is disposed within the opening portion of the disc cartridge. The rotating means includes a drive coil and a yoke mounted on the drive coil. The indicating means is an aperture bored through the disc cartridge. In the preferred embodiment, a pair of initializing magnets are disposed in parallel to the recording magnet.

The above and other objects, features, and advantages of the present invention will become apparent from the following detailed description of an illustrative embodiment thereof in conjunction with the accompanying drawing.

DETAILED DESCRIPTION OF THE PREFERRED EMBODIMENT

The present invention will now described with reference to FIG. 4.

Figure 4:
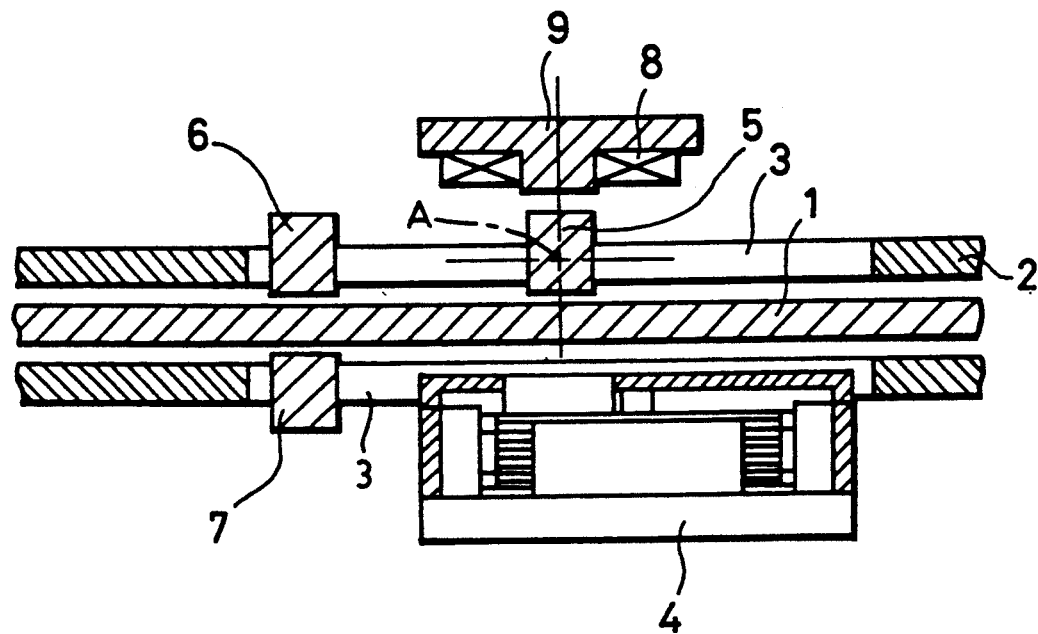
FIG. 4 is a fragmentary cross-sectional side view illustrating a magneto-optical recording apparatus according to an embodiment of the present invention.

FIG. 4 of the accompanying drawings shows a magneto-optical recording apparatus according to an embodiment of the present invention.

Referring to FIG. 4, there is provided a magneto-optical medium (disc) 1 which corresponds to the above disc 21 of the recording type or the above disc 31 of the overwrite recording type. This magneto-optical disc 1 is housed within a disc cartridge 2 of the type depicted in FIG. 3 and exposed through an opening portion 3 of the disc cartridge 2. A magneto-optical head 4 is disposed under the magneto-optical disc 1 and a recording magnet 5 is disposed above the magneto-optical disc 1. Further, initializing magnets 6 and 7 are disposed in parallel to the recording magnet 5.

The recording magnet 5 is disposed so as to become freely rotatable about its center A and one and the other side of the recording magnet 5 relative to the center A are magnetized as an S pole and an N pole, respectively. A drive coil 8 is disposed above the recording magnet 5 and a yoke 9 is mounted on the drive coil 8. When a current of positive or negative polarity is flowed through the drive coil 8, then the recording magnet 5 is rotated in response to the magnetic fields formed on the drive coil 8.

Figure 1:
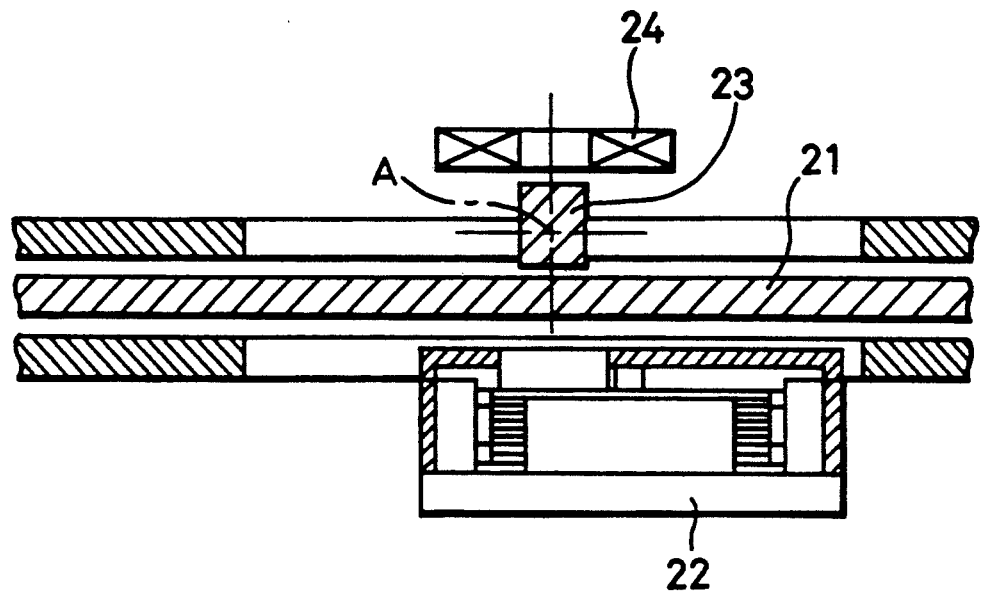
FIG. 1 is a fragmentary cross-sectional side view illustrating an example of a conventional magneto-optical recording apparatus.
Figure 2:
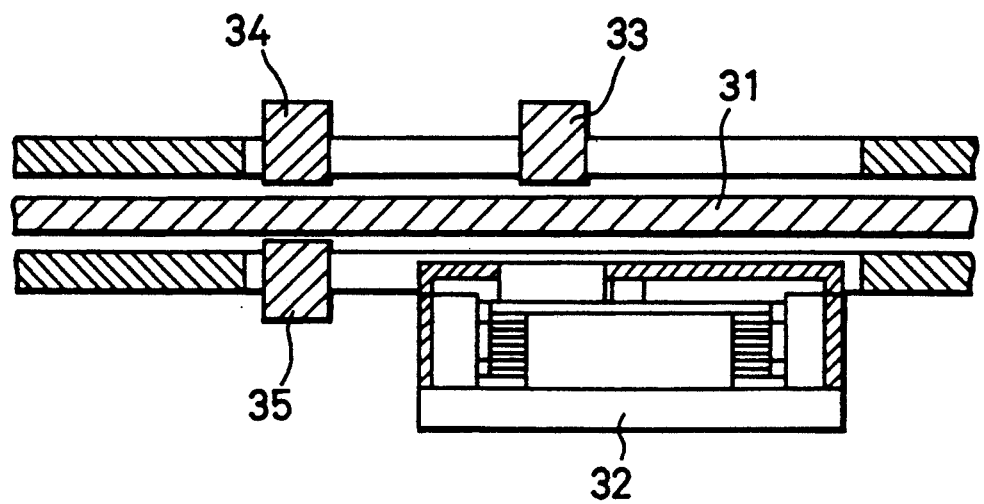
FIG. 2 is a fragmentary cross-sectional side view illustrating another example of the conventional magneto-optical recording apparatus.
Figure 3:
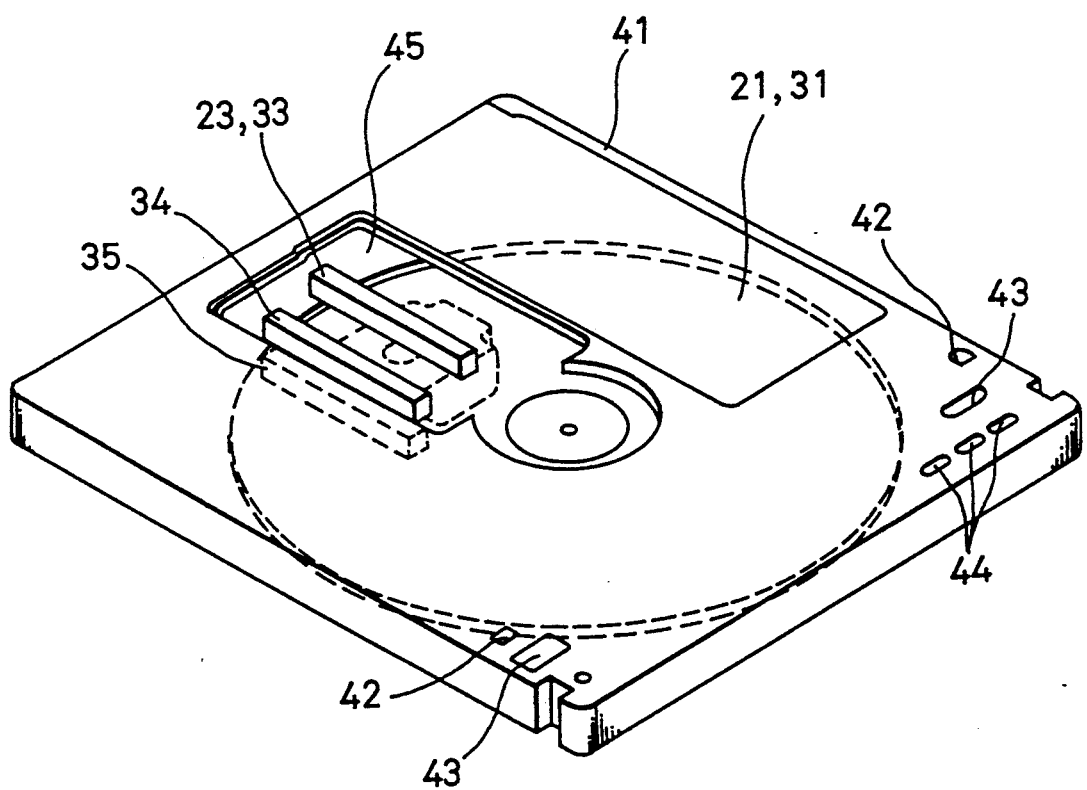
FIG. 3 is a perspective view illustrating a disc cartridge, and to which references are made in explaining the conventional magneto-optical recording apparatus shown in FIGS. 1 and 2.

Accordingly, in this magneto-optical recording apparatus, the type of the disc 1 is identified by the identifying apertures 44 formed on the above-mentioned disc cartridge 41 (see FIG. 3). Then, when the disc 1 is the disc 21 in which the recording is effected after the information is erased, a current of positive or negative polarity is flowed through the drive coil 8 at a predetermined timing, whereby the recording magnet 5 is rotated to implement the recording on the disc 1 after the information is erased. Whereas, when the disc 1 is the overwrite type disc 31, a predetermined current is flowed to the drive coil 8, whereby the recording magnet 5 is fixed to an arbitrary direction. Then, the overwrite recording on the disc 1 is implemented in association with the initializing magnets 6 and 7.

In this magneto-optical recording apparatus, since the yoke 9 is mounted on the drive coil 8, the magnetic fields generated by the drive coil 8 are reinforced, which enable the recording magnet 5 to rotate satisfactorily and which can reduce the necessary electric power. Further, the recording magnet 5 is attracted to the yoke 9, whereby the settle position of the recording magnet 5 can be stabilized satisfactorily.

According to the magneto-optical recording apparatus of the present invention, since the initializing magnets 6 and 7 can be disposed in the vicinity of the recording magnet 5, it is possible to satisfactorily realize the magneto-optical recording apparatus which can effect the recording commonly on both of the disc 21 of the type in which the recording is effected after the information is erased and the overwrite-recording type disc 31.

Furthermore, after the recording magnet 5 is settled, the recording magnet 5 is attracted to the yoke 9, thereby the settle position being determined satisfactorily. Accordingly, during this period, the current need not be flowed in the drive coil 8, whereby the power consumption can be reduced. Also, there is then no risk that a heat is generated by the drive current. Therefore, the magneto-optical recording apparatus can be increased in reliability.

According to the present invention, since the rotating means is composed of the drive coil and yoke, the efficiency of the rotating means can be increased to thereby reduce the power consumption. Furthermore, since the recording magnet is attracted to the yoke, the settle position of the recording magnet can be stabilized satisfactorily.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A magneto-optical recording apparatus for recording information on different types of magneto-optic discs housed in a single type of cartridge having an opening portion, the cartridge including:

indicating means for indicating the type of disc housed in a disc cartridge, the magneto-optical recording apparatus comprising:

(a) a rotatable recording magnet, the recording magnet being disposed within the opening portion of the disc cartridge at a position in which it is opposed to a magneto-optical head across a disc housed within the disc cartridge;

(b) rotating means for rotating the recording magnet depending upon the type of disc housed in the cartridge, as indicated by the indicating means, wherein the rotating means is composed of a coil and a yoke; and (c) at least one initializing magnet which is disposed within the opening portion of the disc cartridge.

2. The magneto-optical recording apparatus according to claim 1, in which the indicating means is an aperture bored through the disc cartridge.

3. The magneto-optical recording apparatus according to claim 1, further comprising a pair of initializing magnets disposed in parallel to the recording magnet.

4. The magneto-optical recording apparatus according to claim 1, in which the type of the disc is either a record-after-erasure type or an overwrite recording type.

5. A magneto-optical recording apparatus for recording information on a magneto-optic disc housed in a cartridge having an opening portion, comprising:

a magneto-optical head disposed on one side of the disc and within the opening portion of the disc cartridge;

a rotatable recording magnet, the recording magnet being disposed within the opening portion of the disc cartridge at a position in which it is opposed to the magneto-optical head and on an opposite side of the disc;

rotating means for rotating the recording magnet depending upon the type of disc housed in the cartridge, wherein the rotating means is composed of a drive coil and a yoke mounted on the drive coil; and at least one initializing magnet which is disposed within the opening portion of the disc cartridge.

6. The magneto-optical recording apparatus according to claim 5, further comprising a pair of initializing magnets disposed in parallel to the recording magnet.

7. The magneto-optical recording apparatus according to claim 5, in which the type of the disc is either a record-after-erasure type or an overwrite recording type.

8. The magneto-optical recording apparatus according to claim 5, wherein the rotatable recording magnet is a permanent magnet.

* * * * *